(12) United States Patent
Song (10) Patent No.: US 11,688,163 B2
(45) Date of Patent: Jun. 27, 2023

(54) TARGET RECOGNITION METHOD AND DEVICE BASED ON MASK RCNN NETWORK MODEL

(71) Applicant: GOERTEK INC., Shandong (CN)

(72) Inventor: Xiufeng Song, Shandong (CN)

(73) Assignee: GOERTEK INC., Shandong (CN)

( * ) Notice: Subject to any disclaimer, the term of this patent is extended or adjusted under 35 U.S.C. 154(b) by 90 days.

(21) Appl. No.: 17/439,719

(22) PCT Filed: Oct. 24, 2020

(86) PCT No.: PCT/CN2020/123476
§ 371 (c)(1),
(2) Date: Sep. 15, 2021

(87) PCT Pub. No.: WO2021/129105
PCT Pub. Date: Jul. 1, 2021

(65) Prior Publication Data
US 2022/0157053 A1      May 19, 2022

(30) Foreign Application Priority Data
Dec. 27, 2019   (CN) .......................... 201911378116.8

(51) Int. Cl.
*G06V 20/17*      (2022.01)
*G06V 20/40*      (2022.01)
(Continued)

(52) U.S. Cl.
CPC ............ *G06V 20/17* (2022.01); *B64C 39/024* (2013.01); *G06V 10/771* (2022.01); *G06V 10/82* (2022.01);
(Continued)

(58) Field of Classification Search
CPC ...... G06V 20/17; G06V 10/771; G06V 20/49; G06V 10/82; G06V 2201/07; B64C 39/024; B64U 2101/30
See application file for complete search history.

(56) References Cited

U.S. PATENT DOCUMENTS 11,074,711 B1 * 7/2021 Akbas ..................... G06F 18/21
2019/0384769 A1 12/2019 Takahashi
2021/0027098 A1 * 1/2021 Ge .......................... G06T 7/194

FOREIGN PATENT DOCUMENTS

CN     107680088 A     2/2018
CN     108399362 A     8/2018
(Continued)

OTHER PUBLICATIONS

Wang et al, "Volumetric Attention for 3D Medical Image Segmentation and Detection", Oct. 13-17, 2019, Medical Image Computing and Computer Assisted Intervention—MICCAI 2019: 22nd International Conference, Shenzhen, China (9 Pages) (Year: 2019).*
(Continued)

*Primary Examiner* — David F Dunphy
(74) *Attorney, Agent, or Firm* — LKGlobal | Lorenz & Kopf, LLP (57) ABSTRACT

A target recognition method and device based on a MASK RCNN network model are disclosed. The method comprises: determining a multi-stage network as a basic network; selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes; training the MASK RCNN recognition net-
(Continued)

works with a data set and stopping training until a preset training end condition is satisfied; and recognizing the target using the MASK RCNN recognition networks after trained. This solution is very suitable for small target recognition of a flying UAV.

19 Claims, 4 Drawing Sheets

(51) Int. Cl.
  *G06V 10/771* (2022.01)
  *G06V 10/82* (2022.01)
  *B64C 39/02* (2023.01)
  *B64U 101/30* (2023.01)
(52) U.S. Cl.
  CPC .......... *G06V 20/49* (2022.01); *B64U 2101/30* (2023.01); *G06V 2201/07* (2022.01)

(56) References Cited

FOREIGN PATENT DOCUMENTS

| CN | 109583517 A | 4/2019 |
| CN | 109614985 A | 4/2019 |
| CN | 110310281 A | 10/2019 |
| CN | 111160527 A | 5/2020 |

OTHER PUBLICATIONS

Shi Jie, Zhou Yali, Zhang Qizhi, Service Robot Item Recognition System Based on Improved MASK RCNN and Kinect, Chinese Journal of Scientific Instrument, Apr. 2019, vol. 40, No. 4, China Academic Journal Electronic Publishing House, Beijing, China.

* cited by examiner

TARGET RECOGNITION METHOD AND DEVICE BASED ON MASK RCNN NETWORK MODEL

CROSS REFERENCE TO RELATED APPLICATIONS

This application is a U.S. National Stage entry under 35 U.S.C. § 371 based on International Application No. PCT/CN2020/123476, filed on Oct. 24, 2020, which claims priority to Chinese Patent Application No. 201911378116.8, filed on Dec. 27, 2019. These applications are hereby incorporated herein in their entirety by reference.

TECHNICAL FIELD

This Application pertains to the field of target recognition of unmanned aerial vehicles, in particular to a target recognition method and device based on a MASK RCNN network model, an electronic apparatus and a readable storage medium.

BACKGROUND

The recognition and tracking of moving targets on the ground by unmanned aerial vehicles (UAV) has important theoretical research significance and application value, and is an important research direction in the field of autonomous control of UAV systems. Currently, the target selection in UAV flight for tracking mostly uses the box selection method. Specifically, the operator selects the target using a selection box by dragging the finger on the mobile phone interface. When the UAV is in flight, the target will move relative to the camera, so marking errors are likely to occur when selecting a target on the mobile interface. Especially when a small target is selected, it is more likely to be mixed with background information, so inaccurate target marking and recognition and marking deviation are easy to occur. In addition, other objects, desirable features and characteristics will become apparent from the subsequent summary and detailed description, and the appended claims, taken in conjunction with the accompanying drawings and this background.

SUMMARY

In view of the above problems, the present disclosure is proposed to provide a target recognition method and device based on a MASK RCNN network model, an electronic apparatus and a readable storage medium that can overcome or at least partially solve the above problems.

According to an aspect of the embodiments of the present disclosure, a method for target recognition based on a MASK RCNN network model is provided. The method comprises:

determining a multi-stage network as a basic network;

selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes;

training the MASK RCNN recognition networks with a data set and stopping training until a preset training end condition is satisfied; and recognizing a target using the MASK RCNN recognition networks after trained.

According to another aspect of the present disclosure, a device for target recognition based on a MASK RCNN network model is provided. The device comprises:

a network determining unit for determining a multi-stage network as a basic network;

a model building unit for selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes;

a model training unit for training the MASK RCNN recognition networks with a data set and stopping training until a preset training end condition is satisfied; and a target recognition unit for recognizing a target using the MASK RCNN recognition networks after trained.

According to yet another aspect of the embodiments of the present disclosure, an electronic apparatus is provided. The electronic apparatus comprises: a processor and a memory arranged to store computer executable instructions, wherein the executable instructions, when executed, cause the processor to perform the above method.

According to still yet another aspect of the embodiments of the present disclosure, a computer readable storage medium is provided, wherein the computer readable storage medium stores one or more programs, and the one or more programs, when executed by a processor, implement the above method.

The technical solutions of the embodiments of the present disclosure can achieve the following technical effects.

The target recognition method based on a MASK RCNN network model provided by the embodiments of the present disclosure comprises: first, selecting and determining a multi-stage network as a basic network; selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes; then, training the MASK RCNN recognition networks with a data set and stopping training until a preset training end condition is satisfied; finally, recognizing the target using the MASK RCNN recognition networks after trained. The above technical solution uses a network model after trained to automatically recognize targets, abandons the traditional solution requiring an operator to manually select targets through a selection box, and significantly reduces the impact of human error on recognition accuracy. Moreover, in order to achieve good recognition results for various types of targets including small targets, the present embodiment improves the MASK RCNN network model, adopts multiple branches to obtain feature maps, and uses feature maps of different dimensions to recognize targets, thereby avoiding the omission of tracked targets.

Experiments have verified that the above solution is very suitable for small target recognition of a flying UAV, and it avoids the interference of background information caused by manual target selection through a selection box, greatly improves the accuracy rate of small target recognition, and provides a more accurate tracking region for the target tracking in the next step.

The above description is only an overview of the technical solutions of the present disclosure. In order to more clearly understand the technical means of the present disclosure to implement the present disclosure according to the contents of the specification, and in order to make the above and other objectives, features and advantages of the present disclosure more obvious and understandable, specific embodiments of the present disclosure will be illustrated hereinafter.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Hereinafter, exemplary embodiments of the present disclosure will be described in more detail with reference to the drawings. Although the drawings show the exemplary embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

Figure 5:
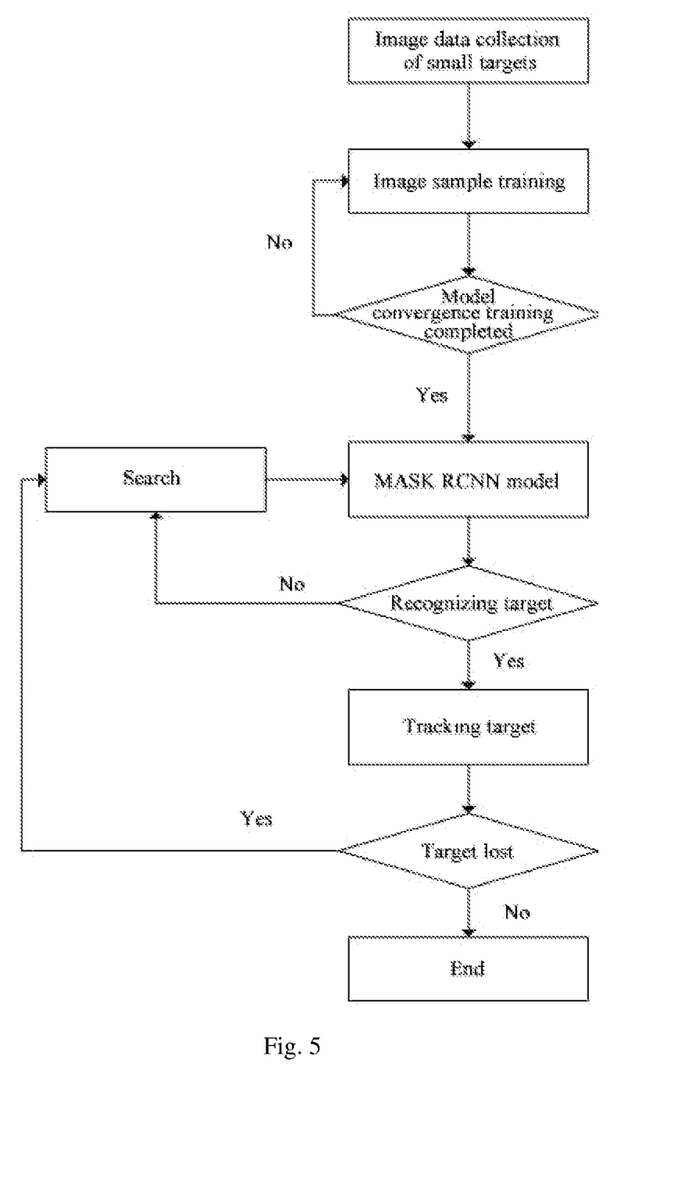
FIG. 5 is a schematic flow chart of target recognition and tracking of UAV according to an embodiment of the present disclosure.

The technical field of the present disclosure is the target recognition and tracking of UAV. As shown in FIG. 5, its overall process includes the steps of image data collection of small targets, image sample training, model convergence training, and obtaining MASK RCNN model (i.e., Mask Region-CNN model, a Mask Region-based Convolutional Neural Network model) after training, recognizing and tracking the target using this network model, etc. Among them, in the target recognition stage, if the target is not recognized, the image is searched and re-recognized; if the target is lost, the image also needs to be re-searched to obtain the recognized target.

The embodiments of the present disclosure mainly involve improving the accuracy rate of target recognition by improving the network model for target recognition. The technical concept includes: abandoning the method of manually selecting a target region by a selection box; constructing a neural network model to recognize a target to be tracked; in order to improve the recognition accuracy of small targets, improving the MASK RCNN network model by increasing the number of branches of MASK RCNN for obtaining feature maps, and acquiring feature maps by high dimensional and low dimensional layers respectively, thereby avoiding the omission of small targets; and with respect to the inaccurate detection of small targets, re-optimizing the acquiring way of the parameter value of IoU in the recognition network.

Figure 1:
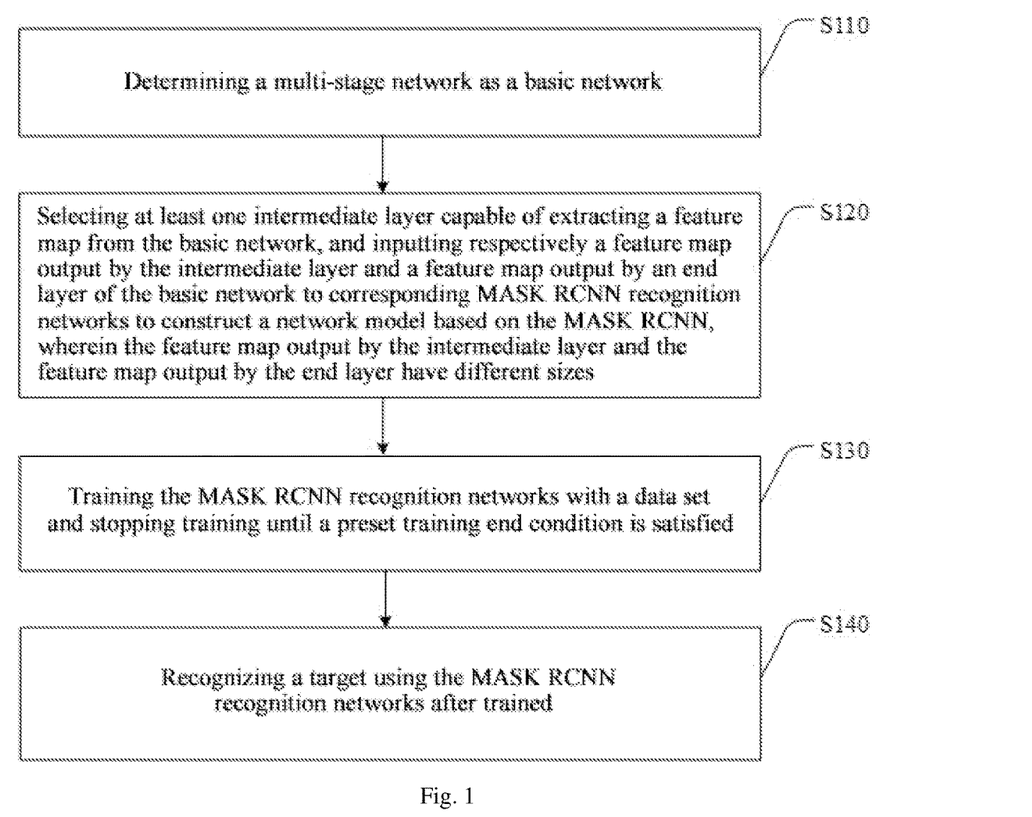
FIG. 1 is a schematic flow chart of a target recognition method based on a MASK RCNN network model according to an embodiment of the present disclosure.

FIG. 1 is a schematic flowchart of a target recognition method based on a MASK RCNN network model according to an embodiment of the present disclosure. The method comprises:

Step S110: determining a multi-stage network as the basic network.

As the first step of building a network model, first, a basic network must be selected. Generally, the basic network includes Vgg network, Inception network, etc. In the present embodiment, in order to recognize targets of different sizes, feature maps are extracted from different network stages for constructing branches of the recognition network. Preferably, the basic network with multiple pooling layers is used, for example, feature maps of lower layers can be used to recognize small targets.

In the present embodiment, the basic network may be determined as Vgg16 which includes 13 convolution (conv) layers, 13 activation function (relu) layers, and 4 pooling layers. The activation function layer does not change the image size, while the pooling layer is a feature extraction layer and can change the image size. The parameters of the 4 pooling layers are set as follows: the convolution kernel size kernel_size=2, the stride stride=2. Every time passing a pooling layer, the output image is ½ of the input image. After passing the above Vgg16 network, the size of the original input image becomes (M/16)*(N/16). Assuming that the length and width of the sample image is 1000*600, the sizes of the feature maps are 500*300*512, 250*150*512, 125*75*512, 60*40*512, where 512 is the number of the convolution kernels in each convolution layer, which is also called the number of channels.

Step S120: selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes.

This step is the core of neural network model construction. In order to achieve the object of using feature maps of different sizes to recognize targets of different sizes, the present embodiment sets up at least two recognition networks to construct a network model based on MASK RCNN, one of the recognition networks acquires the feature map output by the end layer of the basic network, other recognition networks are to be built by selecting the feature maps output by at least one intermediate layer in the basic network. The recognition networks in the present embodiment are obtained by an improvement based on the MASK RCNN model.

Figure 6:
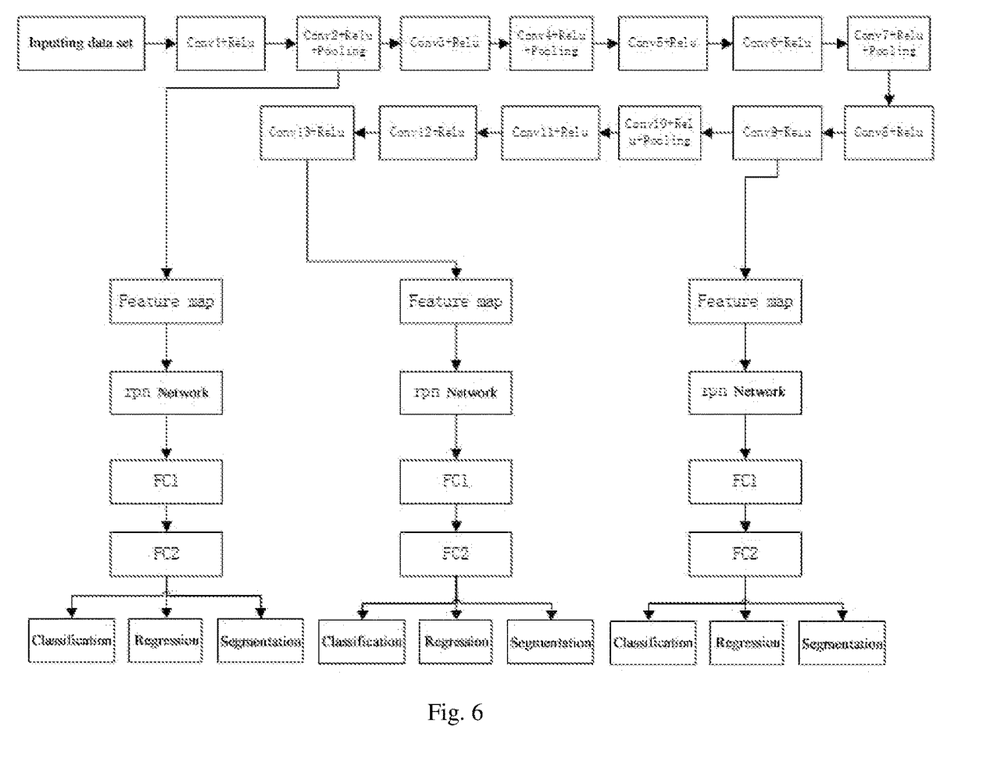
FIG. 6 is a schematic diagram of the structure of a MASK RCNN network model based on an embodiment of the present disclosure.

It should be noted that, referring to FIG. 6, take the MASK RCNN+Vgg16 network model as an example, the conventional network model only outputs a feature map at the back end (i.e., conv13). The recognition effect for small targets (such as, the targets with a small area in the edges of the image) of this processing is poor. The improved model extracts feature maps at the front end (e.g., conv2, conv9), that is, FIG. 6 shows a better extraction method.

Preferably, since one pooling will change the size of the feature map, for example, the image sizes at conv2 and conv3 in FIG. 6 are the same, in order to obtain a better recognition effect, multiple feature maps of different sizes can be extracted.

Step S130: training the MASK RCNN recognition networks with a data set and stopping training until a preset training end condition is satisfied.

The multiple MASK RCNN recognition networks generated are trained respectively to obtain the effect of recognizing targets of different sizes. In the training, the condition for ending the training can be preset, for example, the training is stopped when the accuracy rate of the target recognition reaches 95%.

Step S140, recognizing the target using the MASK RCNN recognition networks after trained.

The model after trained, that is, after convergence trained, can be used to recognize the image of a moving target on the ground obtained by the UAV. The tests have verified that the accuracy rate is greatly improved when this model is used to recognize a moving target on the ground such as a vehicle.

In sum, the present embodiment improves the existing MASK RCNN model to obtain multiple MASK RCNN recognition networks, which greatly improves the recognition effect of targets, especially small targets, avoids the interference of background information, and provides a more precise region for the target tracking in the next step.

In an embodiment, selecting at least one intermediate layer capable of extracting a feature map from the basic network in step S120 comprises:

selecting two intermediate layers capable of extracting a low-level feature map and a high-level feature map of different sizes;

recognizing a first target using a first target recognition network constructed by the low-level feature map;

recognizing a second target using a second target recognition network constructed by the high-level feature map; and recognizing a third target using a third target recognition network constructed by the feature map output by the end layer of the basic network.

The size of the first target is smaller than the size of the second target, and the size of the second target is smaller than the size of the third target.

Referring to FIG. 6, the present embodiment recites a model capable of recognizing three types of targets (large, medium and small targets). In FIG. 6, the lower layer selects the feature map obtained by the conv2 layer, and the high level feature layer selects the feature map obtained by the conv9 layer, then it is combined with the feature map output by the end layer of the basic network, the first, second, and third target recognition network are constructed respectively, to recognize three types of targets (large, medium and small targets). The experimental results show that it has a better recognition effect to recognize targets by selecting the feature maps output by the conv2 layer, the conv9 layer as well as the conv13 layer at the end.

In an embodiment, the intermediate layer comprises a first type and a second type, the first type comprises a convolutional layer and an activation function, and the second type comprises a convolutional layer, an activation function and a pooling layer.

Referring to FIG. 6, the intermediate layer network in the basic network can be divided into the following two types. The first type of intermediate layer only comprises a convolutional layer and an activation function, and the second type of intermediate layer can comprise a convolutional layer, an activation function, and a pooling layer. For example, the intermediate layer where convolution conv2 is located comprises the convolution layer Conv2, the activation function Relu, and the pooling layer Pooling, and the intermediate layer where convolution conv9 is located comprises the convolution layer Conv9 and the activation function Relu.

In addition, the MASK RCNN network model also includes an RPN network, an FC layer, classification, regression and segmentation parts. The RPN (Region Proposal Network) in FIG. 6 is a network for extracting the region proposal; the FC (Fully Connected layer) in FIG. 6 plays a role in the classification of the entire convolutional neural network. If the operations such as the convolutional layer, pooling layer, and activation function layer are to map the original data to the hidden layer feature space, the fully connected layer is to map the learned "distributed feature representation" to the sample label space. The "classification" in FIG. 6 is the classifier to classify the data samples using a function such as softmax. For example, if the images are divided into 5 categories, the classifier can determine which category the image should be classified into, and its output is discrete results; regression outputs continuous results, and generally outputs an optimal result, including obtaining an optimal frame; segmentation refers to the MASK branch of the MASK RCNN network model, and generally a three-dimensional region of interest is segmented from the image to recognize small targets.

In an embodiment, recognizing a first target using a first target recognition network constructed by the low-level feature map comprises: setting parameter values of ratios and parameter values of scales in an RPN network of the first target recognition network to make each pixel in the low-level feature map correspond to a number of anchor box regions in an image input by the first recognition network so that the first target in the sample image can be covered, wherein the number of anchor box regions is greater than a preset number threshold.

After passing the convolutional layer, the size of the feature image of the lowest layer becomes $\frac{1}{16}$ of the original image. When generating the anchor box, a base anchor box (base_anchor) can be defined first, the base anchor box is a box having a size of 16*16. Since it is a point on the feature map (60*40), it can correspond to a 16*16 region on the original image (1000*600).

If the parameter ratios=[0.5, 1, 2], scales=[0.5, 1, 2], the region size on the corresponding original image is obtained after parameter calculation. The ratio refers to the aspect ratio of the anchor box generated, a ratio value represents that an anchor box with this aspect ratio is generated, the scale refers to the ratio of the area of the anchor box generated, that is, anchor boxs with different areas are generated; at the same time, ratio and scale determine the size of the region to be matched on the original image; the anchor boxes are obtained based on each pixel point of the feature map, and each pixel will obtain the coordinate information of 9 anchor boxes in the original image. This method can avoid the offset of the position in the deepest feature map corresponding to the original image caused by downsampling, and it can also correspond well to the region of the original image.

The anchor box regions of different shapes and sizes can be generated according to the parameter value of ratios and parameter value of scales in the recognition model. The more the parameter values of ratios and scales, the more the anchor box regions in the original input image, so as to obtain target regions with finer granularity and thus cover the target in the image, especially recognize the small target better.

Preferably, in the present embodiment, two elements a and b are added to the parameter scales. The specific values of a and b are set according to requirements. Then the parameter scales is [a, 0.5, b, 1.0, 2.0], and the parameter ratios can remain unchanged. Alternatively, one or more elements can also be added to the parameter ratios, which can well cover the target in the scene and obtain diverse anchor boxes.

In an embodiment, recognizing a first target using a first target recognition network constructed by the low-level feature map further comprises: judging whether the anchor box region is the first target, and if it is the first target, adaptively adjusting a parameter value of IoU in the first target recognition network according to an IoU value of the anchor box region.

Since there are two quantization operations and floating-point number roundings in the ROI pooling, an offset will generated in the region of the original image corresponding to the feature map, especially the first target, which will cause a deviation of IoU (Intersection-over-Union) of the anchor box and the ground truth box marked in the original image. For the first target, its area in the original image is small, so even if the determined anchor box offset is not large, since the target area is small, the IoU value may very likely not satisfy a certain threshold value, and thus it cannot be trained, resulting in poor model robustness.

Among them, the IoU, a concept used in target detection, is the overlap rate of generated candidate bound and ground truth bound, which is the ratio of their intersection to union. The ideal case is complete overlap, that is, the ratio is 1.

In order to solve this problem, in the present embodiment, an IoUnet module is created in the RPN network. The IoUnet module can be used to automatically recognize whether the anchor box is a region where an offset occurs and whether it is a small target region, and further provide a condition for self-adaptively adjusting the IoU parameter values in the recognition network.

In an embodiment, judging whether the anchor box region in the RPN network of the first target recognition network is the first target, and if it is the first target, adaptively adjusting a parameter value of IoU in the first target recognition network according to an IoU value of the anchor box region comprises:

presetting an area and an IoU value of a standard region which is a critical region between the second target and the first target;

determining an area of the anchor box region, and determining an IoU value of the anchor box region according to the product of an area ratio of the anchor box region to the standard region and the IoU value of the standard region;

judging the IoU value of the anchor box region and the IoU value of the standard region, if the IoU value of the anchor box region is less than the IoU value of the standard region and a target corresponding to the anchor box region is determined to be the first target, setting the IoU value of the anchor box region as the parameter value of IoU of the first target recognition network, so as to realize the adaptive adjustment of the parameter value of IoU of the first target recognition network model.

The present embodiment discloses a method for adaptively adjusting the parameter value of the IoU in the first target recognition network. Through the above steps, the area of a standard region and the IoU of the standard region are set according to the critical region of the second target and the first target; the IoU corresponding to the anchor box region is calculated according to the size relationship between the standard region and the anchor box region which is suspected to be the first target; during training, if the anchor box region is smaller than the standard region, and the region bounded by the anchor box region is indeed a small target, then the IoU corresponding to the anchor box region is set to be the parameter value of IoU in the first target recognition network by manual adjustment.

According to the test results of the test set, it is shown that the parameter value of IoU in the first target recognition network can be adjusted automatically with the size of the anchor box region, which indicates that it has obtained the ability of adaptive adjustment.

The present embodiment performs supervised classification and regression of the anchor box, determines the target category and region, and learns through the difference between the ground truth box and the predicted anchor box, so as to continuously update the network weights of the RPN network and the RCNN network, thereby obtaining the model after trained.

In an embodiment, training the target recognition model using a data set comprises:

selecting or shooting target images of different angles, distances and sizes, and normalizing the target image to generate the data set; or selecting or shooting target images of different angles, different distances but a same size to generate the data set.

The present embodiment provides methods for acquiring or generating samples in a data set to be trained. One is to select or shoot target images of different angles, distances and sizes, and normalize the target images to generate a data set. The other is to select or shoot target images of different angles, different distances but a same size to generate the data set directly.

Figure 2:
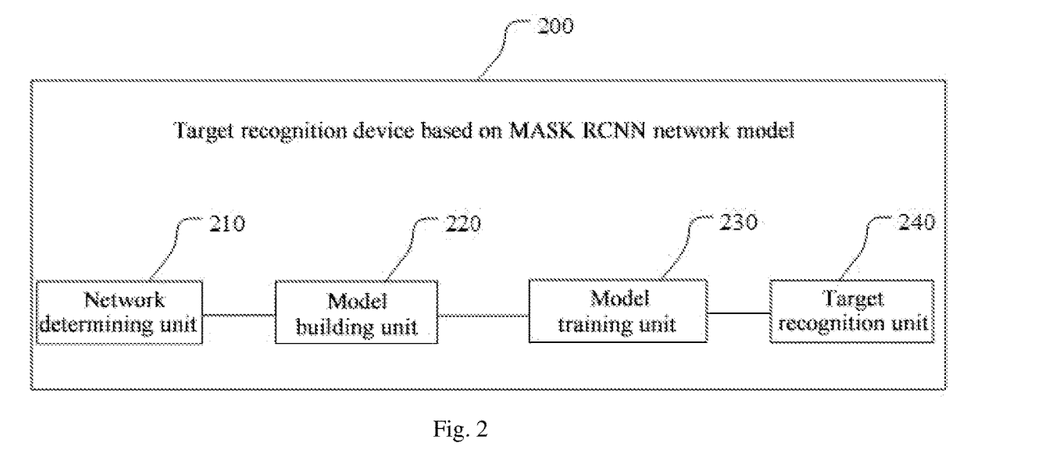
FIG. 2 is a schematic diagram of the structure of a target recognition device based on a MASK RCNN network model according to an embodiment of the present disclosure.

FIG. 2 is a schematic diagram of the structure of a target recognition device based on a MASK RCNN network model according to an embodiment of the present disclosure. The device comprises:

a network determining unit 210 for determining a multi-stage network as a basic network;

As the first step of building a network model, first, a basic network must be selected. Generally, the basic network includes Vgg network, Inception network, etc. In the present embodiment, in order to recognize targets of different sizes, feature maps are extracted from different network stages for constructing branches of the recognition network. Preferably, the basic network with multiple pooling layers is used, for example, low-level feature maps can be used to recognize small targets.

a model building unit 220 for selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes;

In order to achieve the purpose of using feature maps of different sizes to recognize targets of different sizes, the present embodiment sets up at least two recognition networks to construct a network model based on MASK RCNN, one of the recognition networks acquires the feature map output by the end layer of the basic network, other recognition networks are to be built by selecting the feature map output by at least one intermediate layer in the basic network. Among them, the recognition network in the present embodiment is improved based on the MASK RCNN model, and may include the following parts: an RPN network, several fully connected layers, classifiers, regressors, and segmentation mask branches.

a model training unit 230 for training the MASK RCNN recognition networks with a data set and stopping training until a preset training end condition is satisfied;

The multiple MASK RCNN recognition networks generated are trained respectively to obtain the effect of recognizing targets of different sizes. In the training, the condition for ending the training can be preset, for example, the training is stopped when the accuracy rate of the target recognition reaches 95%.

a target recognition unit 240 for recognizing the target using the MASK RCNN recognition networks after trained.

The model after trained, that is, after convergence trained, can be used to recognize the image of the moving target on the ground obtained by the UAV. The tests have verified that the accuracy rate is greatly improved when this model is used to recognize a moving target on the ground such as a vehicle.

In sum, the present embodiment improves the existing MASK RCNN model to obtain multiple MASK RCNN recognition networks, which greatly improves the recognition effect of targets, especially small targets, avoids the interference of background information, and provides a more precise area for the target tracking in the next step.

In an embodiment, the model construction unit 220 is for selecting two intermediate layers capable of extracting a low-level feature map and a high-level feature map of different sizes;

recognizing a first target using a first target recognition network constructed by the low-level feature map;

recognizing a second target using a second target recognition network constructed by the high-level feature map; and recognizing a third target using a third target recognition network constructed by the feature map output by the end layer of the basic network.

The size of the first target is smaller than the size of the second target, and the size of the second target is smaller than the size of the third target.

In an embodiment, the intermediate layer comprises a first type and a second type, the first type comprises a convolutional layer and an activation function, and the second type comprises a convolutional layer, an activation function and a pooling layer.

In an embodiment, the model construction unit 220 is further for setting parameter values of ratios and parameter values of scales in an RPN network of the first target recognition network to make each pixel in the low-level feature map correspond to a number of anchor box regions in an image input by the first recognition network so that the first target in the sample image can be covered, wherein the number of anchor box regions is greater than a preset number threshold; and judging whether the anchor box region in the RPN network of the first target recognition network is the first target, and if it is the first target, adaptively adjusting a parameter value of IoU in the first target recognition network according to an IoU value of the anchor box region.

In an embodiment, the model construction unit 220 is further for presetting an area and an IoU value of a standard region which is a critical region between the second target and the first target;

determining an area of the anchor box region, and determining an IoU value of the anchor box region according to the product of an area ratio of the anchor box region to the standard region and the IoU value of the standard region;

judging the IoU value of the anchor box region and the IoU value of the standard region, if the IoU value of the anchor box region is less than the IoU value of the standard region and a target corresponding to the anchor box region is determined to be the first target, setting the IoU value of the anchor box region as the parameter value of IoU of the first target recognition network, so as to realize the adaptive adjustment of the parameter value of IoU of the first target recognition network model.

In an embodiment, the model training unit 230 is for:

selecting or shooting target images of different angles, distances and sizes, and normalizing the target image to generate the data set; or selecting or shooting target images of different angles and distances but a same size to generate the data set.

In sum, the target recognition method based on a MASK RCNN network model disclosed in the technical solution of the present disclosure comprises: determining a multi-stage network as a basic network; selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes; training the MASK RCNN recognition networks with a data set and stopping training until a preset training end condition is satisfied; and recognizing the target using the MASK RCNN recognition networks after trained. This solution is very suitable for small target recognition of a flying UAV. It avoids the interference of background information caused by target selection through a selection box, provides a more accurate tracking area for the target tracking in the next step, and greatly improves the accuracy rate of small target recognition.

It should be noted:

The algorithms and demonstrations given here are not intrinsically associated with any particular computer, virtual system, or other device. All general-purpose system can be used in conjunction with demonstrations here. Based on the above descriptions, architectures for constructing such a system are apparent. In addition, the present disclosure is not dependent on any particular programming language. It is understandable that various programming languages can be used to realize contents of the present disclosure described herein, and that the above descriptions concerning specific languages are intended to reveal the best implementation of the present disclosure.

In the description provided herein, numerous specific details are set forth. However, it can be understood that embodiments of the present disclosure may be practiced without these specific details. In other examples, well-known methods, structures and techniques have not been shown in detail in order not to obscure an understanding of this description.

Similarly, it should be appreciated that in order to simplify the present disclosure and help understand one or more of the various inventive aspects, in the above description of exemplary embodiments of the present disclosure, various features of the present disclosure are sometimes grouped together in a single embodiment, diagram, or description thereof. However, the method disclosed should not be interpreted as reflecting an intention that the claimed present disclosure requires more features than those expressly recited in each claim. More exactly, as the following claims reflect, inventive aspects include features less than all features of a single foregoing disclosed embodiment. Thus, the claims following the detailed description are hereby expressly incorporated into this detailed description, with each claim being an independent embodiment of the present disclosure.

Those skilled in the art can understand that it is possible to adaptively change the modules in the device in the embodiments and set them in one or more devices different from the embodiments. The modules or units or components in the embodiments can be combined into one module or unit or component, and in addition, they can be divided into multiple sub-modules or sub-units or sub-components. Except that at least some of such features and/or processes or units are mutually exclusive, any combination can be used to combine all features disclosed in this specification (including the accompanying claims, abstract and drawings) and all processes or units of any method or device disclosed in such a way. Unless expressly stated otherwise, each feature disclosed in this specification (including the accompanying claims, abstract and drawings) may be replaced by an alternative feature providing the same, equivalent or similar purpose.

In addition, although some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

The various component embodiments of the present disclosure may be implemented by hardware, or by software modules running on one or more processors, or by their combination. Those skilled in the art should understand that a microprocessor or a digital signal processor (DSP) can be used in practice to implement some or all functions of some or all the components of the target recognition device based on a MASK RCNN network model according to the embodiments of the present disclosure. The present disclosure can also be implemented as a device or device program (for example, a computer program and a computer program product) for executing part or all of the methods described herein. Such a program for realizing the present disclosure may be stored on a computer readable medium, or may have the form of one or more signals. Such signals can be downloaded from Internet websites, or provided on carrier signals, or provided in any other form.

Figure 3:
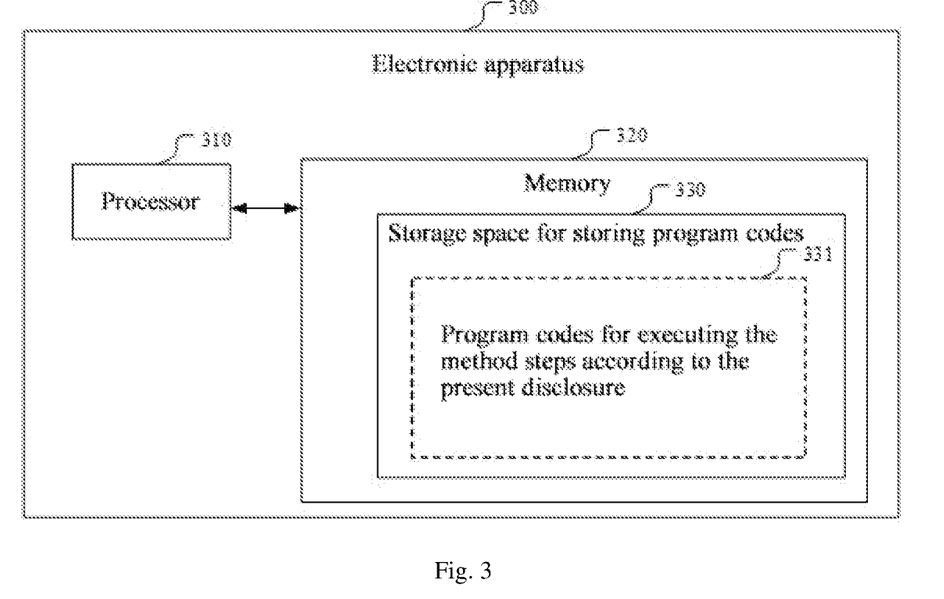
FIG. 3 is a schematic diagram of the structure of an electronic apparatus according to an embodiment of the present disclosure.
Figure 4:
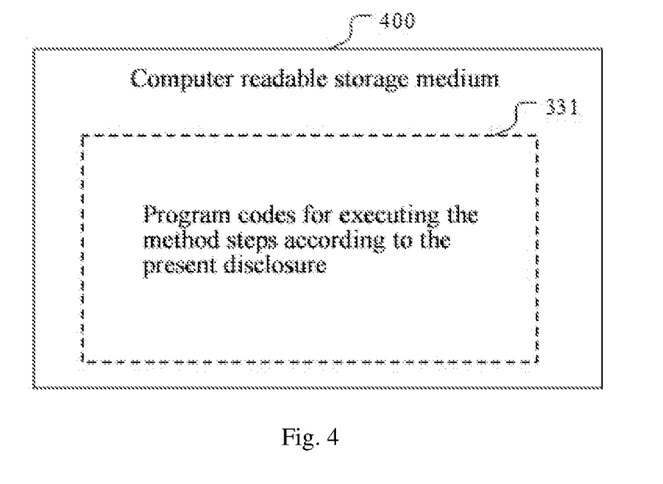
FIG. 4 is a schematic diagram of the structure of a computer readable storage medium according to an embodiment of the present disclosure.

For example, FIG. 3 is a schematic diagram of the structure of an electronic apparatus according to an embodiment of the present disclosure. The electronic apparatus 300 includes a processor 310 and a memory 320 arranged to store computer-executable instructions (computer readable program code). The memory 320 may be an electronic memory such as flash memory, EEPROM (electrically erasable programmable read only memory), EPROM, hard disk, or ROM. The memory 320 has a storage space 330 for storing computer readable program codes 331 for executing any method steps in the above methods. For example, the storage space 330 for storing computer readable program codes may include various computer readable program codes 331 respectively used to implement various steps in the above method. The computer readable program code 331 may be read from or written into one or more computer program products. These computer program products include program code carriers such as hard disks, compact disks (CDs), memory cards or floppy disks. Such a computer program product is typically a computer readable storage medium as shown in, for example, FIG. 4. FIG. 4 is a schematic diagram of the structure of a computer readable storage medium according to an embodiment of the present disclosure. The computer readable storage medium 400 stores the computer readable program code 331 for executing the method steps according to the present disclosure, which can be read by the processor 310 of the electronic apparatus 300. When the computer readable program code 331 is run by the electronic apparatus 300, the electronic apparatus 300 is caused to execute each step in the methods described above. Specifically, the computer readable program code 331 stored in the computer readable storage medium can execute the methods shown in any of the above embodiments. The computer readable program code 331 may be compressed in an appropriate form.

Specifically, the executable instructions stored in the memory 320 of the electronic apparatus 300, when executed, cause the processor 310 to perform the following processing:

determining a multi-stage network as a basic network;

selecting at least one intermediate layer capable of extracting a feature map from the basic network, and inputting respectively the feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes;

training the MASK RCNN recognition networks with a data set and stopping training until a preset training end condition is satisfied; and recognizing the target using the MASK RCNN recognition networks after trained.

Specifically, the executable instructions stored in the memory 320 of the electronic apparatus 300, when executed, cause the processor 310 to perform the following processing:

selecting two intermediate layers capable of extracting a low-level feature map and a high-level feature map of different sizes;

recognizing a first target using a first target recognition network constructed by the low-level feature map;

recognizing a second target using a second target recognition network constructed by the high-level feature map; and recognizing a third target using a third target recognition network constructed by the feature map output by the end layer of the basic network;

wherein a size of the first target is smaller than a size of the second target, and the size of the second target is smaller than a size of the third target.

Further, the executable instructions, when executed, further cause the processor to perform the following processing:

setting parameter values of ratios and parameter values of scales in an RPN network of the first target recognition network to make each pixel in the low-level feature map correspond to a number of anchor box regions in an image input by the first recognition network so that the first target in the sample image can be covered, wherein the number of anchor box regions is greater than a preset number threshold; and judging whether the anchor box region in the RPN network of the first target recognition network is the first target, and if it is the first target, adaptively adjusting a parameter value of IoU in the first target recognition network according to an IoU value of the anchor box region.

Further, the executable instructions, when executed, further cause the processor to perform the following processing:

presetting an area and an IoU value of a standard region which is a critical region between the second target and the first target;

determining an area of the anchor box region, and determining an IoU value of the anchor box region according to the product of an area ratio of the anchor box region to the standard region and the IoU value of the standard region;

judging the IoU value of the anchor box region and the IoU value of the standard region, if the IoU value of the anchor box region is less than the IoU value of the standard region and a target corresponding to the anchor box region is determined to be the first target, setting the IoU value of the anchor box region as the parameter value of IoU of the first target recognition network, so as to realize the adaptive adjustment of the parameter value of IoU of the first target recognition network model.

Further, the executable instructions, when executed, further cause the processor to perform the following processing:

adding two elements to parameter scales and keeping a number of parameter ratios unchanged; or adding two elements to parameter scales and adding one or more elements to parameter ratios.

Further, the executable instructions, when executed, further cause the processor to perform the following processing:

selecting an intermediate layer where conv2 is located from the basic network, and extracting the low-level feature map by this intermediate layer; and selecting an intermediate layer where conv9 is located from the basic network, and extracting the high-level feature map by this intermediate layer.

It should be noted that the above embodiments illustrate rather than limit the present disclosure, and those skilled in the art can design alternative embodiments without departing from the scope of the appended claims. In the claims, any reference signs placed between parentheses should not be constructed as a limitation to the claims. The word "comprising" does not exclude the presence of elements or steps not listed in the claims. The word "a" or "an" preceding an element does not exclude the presence of multiple such elements. The present disclosure can be implemented by means of hardware comprising several different elements and by means of a suitably programmed computer. In the unit claims enumerating several devices, several of these devices may be embodied in the same hardware item. The use of the words "first", "second" and "third" does not indicate any order. These words can be interpreted as names.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A target recognition method based on a MASK RCNN network model, comprising:
    determining a multi-stage network as a basic network;
    selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes;
    training the MASK RCNN recognition networks with a data set and stopping training until a preset training end condition is satisfied; and
    recognizing a target using the MASK RCNN recognition networks after trained.

2. The method according to claim 1, wherein selecting at least one intermediate layer capable of extracting a feature map from the basic network comprises:
    selecting two intermediate layers capable of extracting a low-level feature map and a high-level feature map of different sizes;
    recognizing a first target using a first target recognition network constructed by the low-level feature map;
    recognizing a second target using a second target recognition network constructed by the high-level feature map; and
    recognizing a third target using a third target recognition network constructed by the feature map output by the end layer of the basic network;
    wherein a size of the first target is smaller than a size of the second target, and the size of the second target is smaller than a size of the third target.

3. The method according to claim 2, wherein recognizing a first target using a first target recognition network constructed by the low-level feature map comprises:
    setting parameter values of ratios and parameter values of scales in an RPN network of the first target recognition network to make each pixel in the low-level feature map correspond to a number of anchor box regions in an image input by the first recognition network so that the first target in the sample image can be covered, wherein the number of anchor box regions is greater than a preset number threshold.

4. The method according to claim 3, wherein recognizing a first target using a first target recognition network constructed by the low-level feature map further comprises:

judging whether the anchor box region is the first target, and if it is the first target, adaptively adjusting a parameter value of IoU in the first target recognition network according to an IoU value of the anchor box region.

5. The method according to claim 4, wherein judging whether the anchor box region is the first target, and if it is the first target, adaptively adjusting a parameter value of IoU in the first target recognition network according to an IoU value of the anchor box region comprises:

presetting an area and an IoU value of a standard region which is a critical region between the second target and the first target;

determining an area of the anchor box region, and determining an IoU value of the anchor box region according to a product of an area ratio of the anchor box region to the standard region and the IoU value of the standard region;

judging the IoU value of the anchor box region and the IoU value of the standard region, if the IoU value of the anchor box region is less than the IoU value of the standard region and a target corresponding to the anchor box region is determined to be the first target, setting the IoU value of the anchor box region as the parameter value of IoU of the first target recognition network, so as to realize adaptive adjustment of the parameter value of IoU of the first target recognition network model.

6. The method according to claim 3, wherein setting parameter values of ratios and parameter values of scales comprises:

adding two elements to parameter scales and keeping a number of parameter ratios unchanged; or adding two elements to parameter scales and adding one or more elements to parameter ratios.

7. The method according to claim 2, wherein selecting two intermediate layers comprises:

selecting an intermediate layer where conv2 is located from the basic network, and extracting the low-level feature map by this intermediate layer; and selecting an intermediate layer where conv9 is located from the basic network, and extracting the high-level feature map by this intermediate layer.

8. The method according to claim 1, wherein the intermediate layer comprises a first type and a second type, the first type comprises a convolutional layer and an activation function, and the second type comprises a convolutional layer, an activation function and a pooling layer.

9. The method according to claim 1, wherein training the recognition networks using a data set comprises:

selecting or shooting target images of different angles, distances and sizes, and normalizing the target images to generate the data set; or selecting or shooting target images of different angles and distances but a same size to generate the data set.

10. A target recognition device based on a MASK RCNN network model, comprising:

a network determining unit for determining a multi-stage network as a basic network;

a model building unit for selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes;

a model training unit for training the MASK RCNN recognition networks with a data set and stopping training until a preset training end condition is satisfied; and a target recognition unit for recognizing a target using the MASK RCNN recognition networks after trained.

11. The device according to claim 10, wherein the model construction unit is for selecting two intermediate layers capable of extracting a low-level feature map and a high-level feature map of different sizes;

recognizing a first target using a first target recognition network constructed by the low-level feature map;

recognizing a second target using a second target recognition network constructed by the high-level feature map; and recognizing a third target using a third target recognition network constructed by the feature map output by the end layer of the basic network;

wherein a size of the first target is smaller than a size of the second target, and the size of the second target is smaller than a size of the third target.

12. The device according to claim 11, wherein the model construction unit is further for setting parameter values of ratios and parameter values of scales in an RPN network of the first target recognition network to make each pixel in the low-level feature map correspond to a number of anchor box regions in an image input by the first recognition network so that the first target in the sample image can be covered, wherein the number of anchor box regions is greater than a preset number threshold; and judging whether the anchor box region in the RPN network of the first target recognition network is the first target, and if it is the first target, adaptively adjusting a parameter value of IoU in the first target recognition network according to an IoU value of the anchor box region.

13. The device according to claim 11, wherein the model construction unit is further for presetting an area and an IoU value of a standard region which is a critical region between the second target and the first target;

determining an area of the anchor box region, and determining an IoU value of the anchor box region according to a product of an area ratio of the anchor box region to the standard region and the IoU value of the standard region;

judging the IoU value of the anchor box region and the IoU value of the standard region, if the IoU value of the anchor box region is less than the IoU value of the standard region and a target corresponding to the anchor box region is determined to be the first target, setting the IoU value of the anchor box region as the parameter value of IoU of the first target recognition network, so as to realize adaptive adjustment of the parameter value of IoU of the first target recognition network model.

14. An electronic apparatus, comprising: a processor; and a memory arranged to store computer executable instructions, wherein the executable instructions, when executed, cause the processor to perform the following processing:

determining a multi-stage network as a basic network;

selecting at least one intermediate layer capable of extracting a feature map from the basic network, and inputting respectively a feature map output by the intermediate layer and a feature map output by an end layer of the basic network to corresponding MASK RCNN recognition networks to construct a network model based on the MASK RCNN, wherein the feature map output by the intermediate layer and the feature map output by the end layer have different sizes;

training the MASK RCNN recognition networks with a data set and stopping training until a preset training end condition is satisfied; and recognizing a target using the MASK RCNN recognition networks after trained.

15. The electronic apparatus of claim 14, wherein the executable instructions in the memory, when executed, further cause the processor to perform the following processing:

selecting two intermediate layers capable of extracting a low-level feature map and a high-level feature map of different sizes;

recognizing a first target using a first target recognition network constructed by the low-level feature map;

recognizing a second target using a second target recognition network constructed by the high-level feature map; and recognizing a third target using a third target recognition network constructed by the feature map output by the end layer of the basic network;

wherein a size of the first target is smaller than a size of the second target, and the size of the second target is smaller than a size of the third target.

16. The electronic apparatus of claim 15, wherein the executable instructions in the memory, when executed, further cause the processor to perform the following processing:

setting parameter values of ratios and parameter values of scales in an RPN network of the first target recognition network to make each pixel in the low-level feature map correspond to a number of anchor box regions in an image input by the first recognition network so that the first target in the sample image can be covered, wherein the number of anchor box regions is greater than a preset number threshold; and judging whether the anchor box region in the RPN network of the first target recognition network is the first target, and if it is the first target, adaptively adjusting a parameter value of IoU in the first target recognition network according to an IoU value of the anchor box region.

17. The electronic apparatus of claim 16, wherein the executable instructions in the memory, when executed, further cause the processor to perform the following processing:

adding two elements to parameter scales and keeping a number of parameter ratios unchanged; or adding two elements to parameter scales and adding one or more elements to parameter ratios.

18. The electronic apparatus of claim 15, wherein the executable instructions in the memory, when executed, further cause the processor to perform the following processing:

presetting an area and an IoU value of a standard region which is a critical region between the second target and the first target;

determining an area of the anchor box region, and determining an IoU value of the anchor box region according to a product of an area ratio of the anchor box region to the standard region and the IoU value of the standard region;

judging the IoU value of the anchor box region and the IoU value of the standard region, if the IoU value of the anchor box region is less than the IoU value of the standard region and a target corresponding to the anchor box region is determined to be the first target, setting the IoU value of the anchor box region as the parameter value of IoU of the first target recognition network, so as to realize adaptive adjustment of the parameter value of IoU of the first target recognition network model.

19. The electronic apparatus of claim 15, wherein the executable instructions in the memory, when executed, further cause the processor to perform the following processing:

selecting an intermediate layer where conv2 is located from the basic network, and extracting the low-level feature map by this intermediate layer; and selecting an intermediate layer where conv9 is located from the basic network, and extracting the high-level feature map by this intermediate layer.

* * * * *